July 18, 1961

F. W. SHIREY 2,992,639

NON-SEIZING HYDRAULIC VALVE LIFTER

Filed Feb. 4, 1960

INVENTOR.
Frank W. Shirey
BY
Henry E. Otto
Attorney

July 18, 1961 F. W. SHIREY 2,992,639
NON-SEIZING HYDRAULIC VALVE LIFTER
Filed Feb. 4, 1960 2 Sheets-Sheet 2

INVENTOR.
Frank W. Shirey
BY
Attorney

United States Patent Office 2,992,639
Patented July 18, 1961

2,992,639
NON-SEIZING HYDRAULIC VALVE LIFTER
Frank W. Shirey, Irwin, Pa., assignor to Westinghouse Air Brake Company, Wilmerding, Pa., a corporation of Pennsylvania
Filed Feb. 4, 1960, Ser. No. 6,704
3 Claims. (Cl. 123—90)

This invention relates to valve lifters of the hydraulic type utilized in automotive engines and more particularly to a hydraulic type valve lifter of novel construction to prevent seizure of the lifter due to dirt and carbon particles in the oil utilized as the hydraulic medium.

On some modern automotive engines, to obtain a maximum of engine efficiency and a minimum of valve noise, hydraulic valve lifters are used on the exhaust valves and the intake valves. The hydraulic valve lifters now in use are of the type comprising a lifter body or tappet of hardened steel having an internal bore within which a plunger or piston is slidably positioned and having a central passage and inlet ball check valve to permit fluid to flow past the ball check valve to a hydraulic chamber beneath the piston. When the tappet is raised by cam shaft action, the fluid in the hydraulic chamber beneath the piston acts as a hydraulic ram on the piston to thereby form an unbroken linkage comprising the tappet, the hydraulic fluid in the hydraulic chamber, and the piston, all of which act with a solid contact on the valve push rod being controlled. To prevent excessive leakage of fluid from the hydraulic chamber past the piston, the bore of the tappet and the outer surface of the piston are required to be lapped, that is polished or ground, to a very fine finish with exceedingly small diameter tolerances. The machining of these finishes on the hydraulic lifters is an expensive manufacturing process which, when the lifter is assembled and in operation, very often results in faulty operation thereof due to seizure of the piston in the bore by small particles of dirt and the carbon formation found in engine oils used as the fluid in the hydraulic chamber.

According to the present invention, there is provided a new and novel hydraulic valve lifter which inherently enables lower manufacturing cost and which eliminates the possibility of seizure or binding of the valve lifter piston within the valve lifter body or tappet. The new hydraulic lifter is constructed with ample clearance between the piston and the lifter body such that foreign particles will not affect the relative movement therebetween, and therefore does not require the expensive machining process necessitated in manufacturing of the hydraulic valve lifters in present day use. A packing cup is utilized as a seal between the piston and the lifter body, with the pliable flanges of the packing cup directed toward the hydraulic chamber of the valve lifter in such a manner as to not only act as a seal preventing fluid from flowing from the hydraulic chamber along the outside of the piston when the valve lifter is raising an exhaust or inlet valve to be opened, but also act as a fluid inlet valve for permitting supply of fluid into said hydraulic chamber when excessive valve stem clearance occurs. An oil and heat resistant O-ring under tension encircles the piston above the packing cup and acts as a check valve to control the rate of discharge of oil from the hydraulic chamber in the event the oil therein becomes excessive in amount.

In the accompanying drawings, FIG. 1 is an outline view of a typical automotive engine with a segment of the engine block broken away so as to show in two different sectional planes, respectively, the position of the valve lifters with respect to the cam shaft and valves, and the pistons controlled by said valves.

Description

Figure 1:
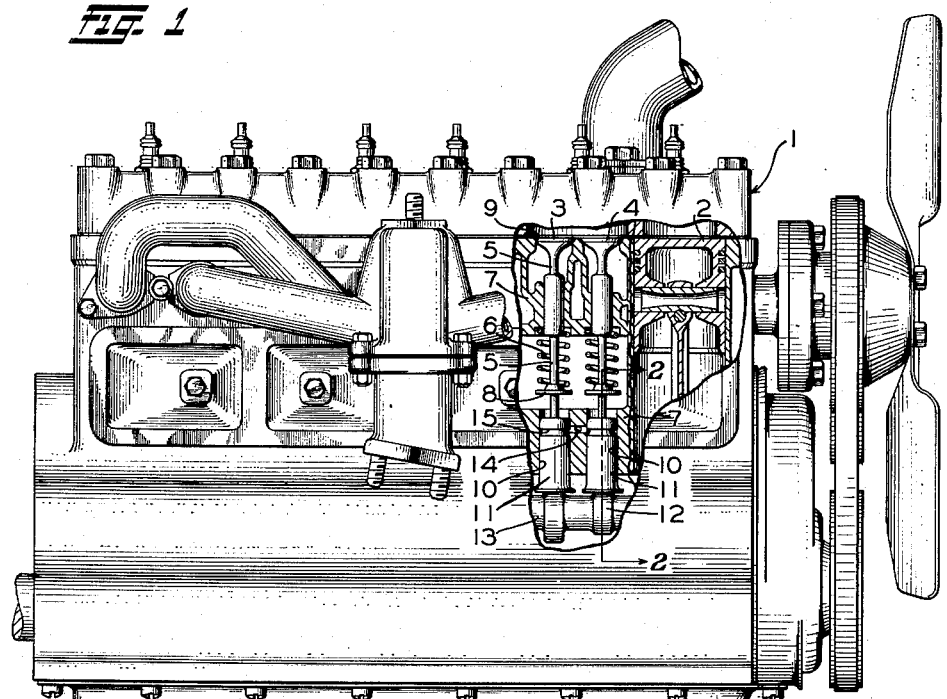

Referring to FIG. 1, a conventional automotive engine 1 is shown with a sectional view of a piston 2 of the engine and with the inlet and exhaust valves 3 and 4, respectively, in their relative positions. The valves 3 and 4 each have a guided valve stem 5 with a valve spring 6 encircling the stem between the engine block 7 and a shoulder 8 on the valve stem 5 to bias the valve stem to a seated or closed position on a valve seat 9. The valve stem 5 on each valve extends into valve bores 10 in the engine block 7 where said stem engages the hydraulic valve lifters 11 sildably positioned within said valve bores 10 and adapted to be moved up and down therein in response to rotary action of cams 12 on a cam shaft 13 suitably rotated in conventional manner from the crankshaft by gear means not shown. Fluid under pressure, in this instance engine lubricating oil, is pumped by the usual oil pump (not shown) from the engine crankcase oil pan (not shown) via internal lubricating passages (not shown) to a passage 14 between each pair of valves 3 and 4 and thence to the valve bores 10 to be received in a circular recess 15 in the lifters 11 as explained hereinafter.

Figure 2:
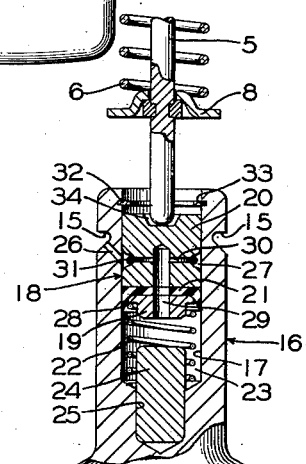
FIG. 2 is an enlarged sectionalized view, showing in detail the construction of the hydraulic valve lifter embodying the invention, together with the operating cam therefor, the valve lifter being shown in an operating condition.
Figure 3:
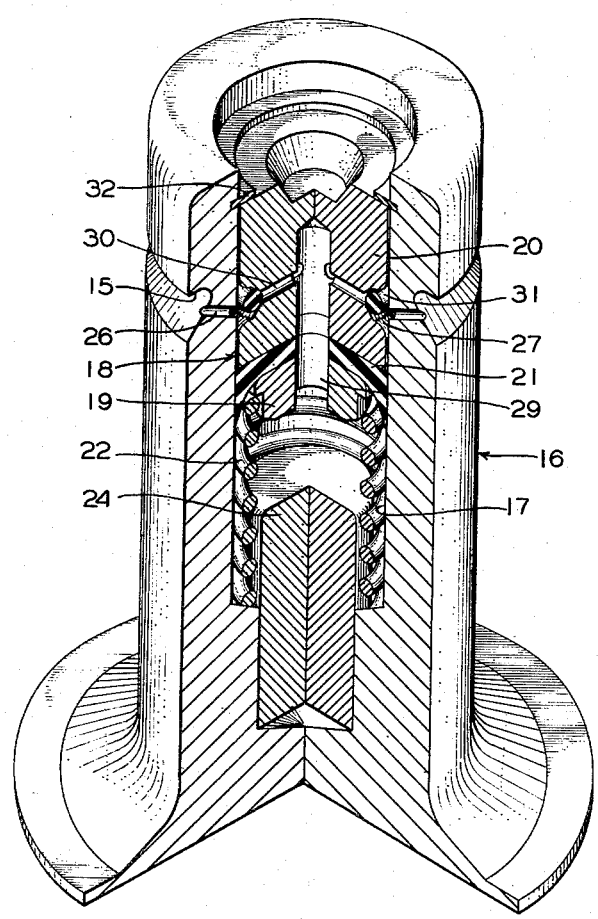
FIG. 3 is an enlarged isometric view of the lifter body shown partly in section to illustrate details of the piston assembly.

As shown in FIGS. 2 and 3, the hydraulic valve lifter 11 includes the lifter body 16, cylindrical in shape to conform with the valve bore 10 in which said lifter operates. One end of the lifter body is constructed within an enlarged contact surface for operational engagement with the rotating cam 12 so as to be moved up and down within the valve bore 10.

Formed within the lifter body 16 is a piston bore 17 in which a piston unit or assembly 18 is slidably positioned, said piston unit being of a diameter substantially smaller than the diameter of the bore 17, as for example with a clearance of .003 of an inch to .016 of an inch to provide a loose fitting between said piston unit and said bore. In FIG. 3, this clearance is shown to an exaggerated degree for visibility. The piston unit or assembly 18 comprises a piston 19, a valve stem seat 20, and a packing cup 21 located between the piston and the valve stem seat 20, all maintained movable as a single compact piston unit or assembly 18 due to the downward force of the valve spring 6 acting on the valve stem 5 and the valve stem seat 20 in opposition to the upward force of a piston spring 22 acting on the piston 19 as explained in more detail hereinafter. A hydraulic chamber 23, to which engine oil is supplied as later explained, is formed beneath the piston 19 by the walls of piston bore 17. The piston spring 22 is interposed in chamber 23 between the underside of the piston 19 and the lower end of the bore 17 in a manner to bias the piston upward, and encircles a stop pin 24 of predetermined length pressed into a bore 25 in the body 11 to limit the downward movement of the piston 19. The chamber 23 is filled with oil from the crankcase under oil pump pressure by way of internal lubricating passages (not shown) in the engine block, passage 14, recess 15 in the lifter body 11, one or more ports 26 (only one being shown) to an annular oil groove 27 encircling the valve stem seat 20 and down along the walls of the piston bore 17 to deflect the downward directed outer flange 28 of the packing cup 21 and into the chamber 23. Oil may be discharged from the chamber 23 at a controlled rate by way of a central passage 29 extending from the chamber 23 through the center of the piston 19 and packing cup 21, into the valve stem seat 20 to a plurality of radial discharge ports 30 and thence past a heat and oil resistant O-ring 31 encircling the valve stem seat 20 in the oil groove 27. The O-ring 31 is under predetermined circumferential tension to act as an unidirectional valve for flow of oil from the discharge ports 30 to the oil groove 27.

A retainer ring 32 of the snap type is inserted in a slot 33 in the walls of the bore 17 to limit the upward movement of the piston unit 18. The valve rod stem 5 engages the top of the valve stem seat 20 in a tapered recess 34.

*Operation*

In that valves 3 and 4 operates exactly the same, the operation of valve 3 only is described hereinafter, it being understood that any operation of valve 3 is duplicated by a sequential operation of valve 4 in a manner well known to those in the automotive engine field.

The valve lifter 11 is operated by rotation of the cam 12 with rotation of the cam shaft 13. Viewing FIG. 2, as the cam 12 rotates in a clockwise direction such that the high point or lobe 35 of the cam engages the contact surface of the lifter body 16, the valve lifted body is slidably moved upward within the bore 10 (FIG. 1). Under ideal conditions with the hydraulic chamber 23 completely filled with oil and no unwanted clearance existing between the valve stem seat 20 and the valve stem 5, during upward movement of the valve lifter body 16 by the cam 12, the hydraulic chamber 23 acts as a hydraulic ram to move the piston unit 18 and the engaging valve stem 5 upward to open the valve 3. As the cam 12 continues to rotate, the lobe 35 of the cam passes off the contact surface of the lifter body 16 permitting the inherent forces of the valve spring 6 to act on the shoulder 8 to reseat the valve and move the valve lifter body 16 with the piston unit 18 and hydraulic chamber 23 in a downward direction to a lowermost position, as shown in FIG. 2.

It should be noted that during the just described upward movement of the valve lifter 11, the oil under pressure in the hydraulic chamber 23 is maintained therein by the fluid pressure acting on the inside of the downward protruding flanges 28 of the packing cup 21 to maintain a leak-proof seal between the packing cup 21 and the walls of the bore 17, thereby eliminating the necessity of close diameter tolerances between the piston 19 and the walls of the bore 17, as has been the requirement in previous valve lifters. Leakage past the O-ring 31 is prevented by the fact that the inherent tension on the O-ring 31 is of sufficient degree to overcome normal operating pressure of the oil in the chamber 23; however, the O-ring will be expanded to release a limited amount of oil from the chamber 23 when the pressure in chamber 23 increases over a predetermined pressure due to the abnormal occurrence of sticking valves or some similar incident as explained hereinatfer.

In the event of carbon or dirt deposits forming on the valve seat 9, proper seating of the valve 3 is prevented which in turn prohibits complete downward movement of the valve stem 5 to tend to create an undesired clearance or valve lash between the end of the valve stem 5 and the valve stem seat 20, resulting in noisy and inefficient engine operation. The present invention precludes the possibility of valve lash due to the fact that the instant there is any clearance between the valve stem seat 20 and the valve stem 5, the piston spring 22 moves the piston unit 18, includes the valve stem seat 20, into engagement with the valve stem 5, simultaneously with the flow of an additional supply of oil past the packing cup flange 28 to the valve chamber 23 to fill the void created therein by the upward movement of the piston unit.

Should negative valve lash occur due to expansion of the valve components when heated, or if the valve should stick closed for any reason such as carbon particles binding the movement of the valve stem 5, damage to the valve structure by the upward movement of the valve lifter 11 against the valve stem is prevented because the upward movement of the lifter body 16 without movement of the piston unit 18 effects an increase of pressure of the oil in chamber 23 to a predetermined degree sufficient to expand the O-ring 31 and release the required amount of oil from the chamber 23 to the oil groove 27.

It can thus be seen that at all times the packing cup 21 acts as a unidirectional valve for maintaining a full supply of oil in chamber 23, under the control of the O-ring 31, while at the same time acting as a leakproof seal to prevent oil from the chamber 23 leaking between the outer walls of the piston 19 and the walls of bore 17 thereby permitting the provision of ample clearance between the piston and the bore for free movement of the piston with the bore, without likelihood of seizing.

Having now described the invention, what I claim as new and desire to secure by Letters Patent is:

1. A hydraulic type valve lifter for valve stems of automotive engines, said lifter comprising a body portion having a coaxial bore therein closed on one end, a piston assembly slidable within said coaxial bore and being of a diameter substantially less than the diameter of said bore to provide a loose fit between said piston assembly and said bore, said piston assembly having a valve stem seating portion engageable with the valve stem through the open end of said bore and a piston portion forming a chamber with the closed end of said bore, packing cup means carried by said piston assembly, said packing cup means having a peripheral flange circumferentially engaging the wall of said bore, passage means in said body portion via which hydraulic fluid is conducted to said bore on one side of said packing cup means to be conducted past the said peripheral flange of said packing cup means in one direction only to the other side thereof into the chamber at the closed end of the said bore, which hydraulic fluid forms a hydraulic ram between the said piston portion of said piston assembly and the said body portion when the said body portion transmits a valve stem lifting force via said piston portion and said valve seating portion of said piston assembly to the valve stem, a coaxial passage in said piston assembly opening at one end into the chamber at the closed end of said bore and extending into said valve stem seating portion, and a plurality of radial ports in said valve stem seating portion establishing communication between said coaxial passage and said bore on said one side of said peripheral flange, and unidirectional valve means operable responsively to a predetermined pressure of hydraulic fluid in the chamber to permit flow of hydraulic fluid from the chamber to the said bore on said one side of the peripheral flange via said coaxial passage means and said radial ports.

2. A hydraulic type valve lifter for valve stems of automotive engines, said lifter comprising a body portion having a coaxial bore therein closed on one end, a piston assembly slidable within said coaxial bore and being of a diameter substantially less than the diameter of said bore to provide a loose fit between said piston assembly and said bore, said piston assembly having a valve stem seating portion engageable with the valve stem through the open end of said bore and a piston portion forming a chamber with the closed end of said bore, packing cup means carried by said piston assembly, said packing cup means having a peripheral flange circumferentially engaging the wall of said bore, passage means in said body portion via which hydraulic fluid is conducted to said bore on one side of said packing cup means to be conducted past the said peripheral flange of said packing cup means in one direction only to the other side thereof into the chamber at the closed end of the said bore, which hydraulic fluid forms a hydraulic ram between the said piston portion of said piston assembly and the said body portion when the said body portion transmits a valve stem lifting force via said piston portion and said valve seating portion of said piston assembly to the valve stem, a coaxial passage in said piston assembly opening at one end into the chamber at the closed end of said bore and extending into said valve stem seating portion, and a plurality of radial ports in said valve stem seating portion establishing communication between said coaxial passage and said bore on said one side of said peripheral flange, an annular groove in the outer periphery of said valve stem seating portion into which said radial ports open, and a resilient O-ring in said annular groove which yields responsively to a hydraulic pressure in said chamber exceeding a certain pressure to permit venting flow therepast of hydraulic fluid from the chamber to the said annular groove.

3. A hydraulic type valve lifter as claimed in claim 2, further characterized in that the said resilient O-ring seats in said groove to prevent flow of fluid therepast into the said ports and yields radially outward responsively to a hydraulic pressure in said chamber exceeding a certain pressure to permit unidirectional flow therepast of hydraulic fluid from the chamber to the said bore on said one side of the peripheral flange.

References Cited in the file of this patent

UNITED STATES PATENTS

| | | |
|---|---|---|
| Re. 21,931 | Voorhies et al. | Oct. 21, 1941 |
| 2,394,354 | Barr | Feb. 5, 1946 |